United States Patent [19]

van Dalen et al.

[11] 4,420,452

[45] Dec. 13, 1983

[54] PROCESS AND DEVICE FOR INJECTION-MOLDING PLASTICS

[75] Inventors: Hendrik van Dalen, Geleen; Willem Schlösser, Kerkrade, both of Netherlands

[73] Assignee: Stamicarbon B.V., Geleen, Netherlands

[21] Appl. No.: 277,854

[22] Filed: Jun. 26, 1981

[51] Int. Cl.³ .............................................. B29F 1/00
[52] U.S. Cl. ............................. 264/328.8; 264/328.12
[58] Field of Search ......................... 264/328.8, 328.12

[56] References Cited

U.S. PATENT DOCUMENTS

| | | | |
|---|---|---|---|
| 2,182,389 | 12/1939 | Reid | 264/327 X |
| 2,191,703 | 2/1940 | Anderson | 264/328.11 X |
| 2,199,144 | 4/1940 | Tegarty | 264/328.8 X |
| 3,861,841 | 1/1975 | Hanning | 425/146 |
| 4,041,122 | 8/1977 | Quick | 264/277 |

FOREIGN PATENT DOCUMENTS 48-13711  4/1973  Japan ............................ 264/328.8

Primary Examiner—Thomas P. Pavelko

[57] ABSTRACT

Process and device for injection molding plastics. The injection material charge is introduced into the mold to obtain an uninterrupted flow front by initially injecting the material into the mold through at least one first gate and through a subsequent gate or gates only after the flow front passes the subsequent gate(s). An injection molding device having separately and variously controllable valves located in the supply lines interconnecting an injection molding apparatus, mold and gates.

4 Claims, 1 Drawing Figure

PROCESS AND DEVICE FOR INJECTION-MOLDING PLASTICS

BACKGROUND AND SUMMARY OF THE INVENTION

The present invention relates to a process and device for the injection-molding of plastics by introducing the injection molding material into a mold through various entry gates.

Processes for the injection-molding of plastic materials by introducing the plastic into the mold through various gates are already known. In these processes the injection mold is filled by supplying the plastic melt simultaneously through the various gates with the advancing fronts of the melt, which extend from each gate, subsequently merging in the mold.

The ultimate strength of such an injection-molded article is less at the weld lines which develop between the melt fronts than at locations away from the weld lines. Moreover, the weld lines frequently remain visible on the article, which renders the article visually unattractive.

An already-known process for the manufacture of thin tubes, such as full length Foley catheters, is described in U.S. Pat. No. 4,041,122, wherein melt material is successively let into a mold through various inlets. In such process, material can initially enter the injection mold from one gate proximally of a follower but enters through other gates only after the slidably disposed follower, or follower(s), located on a wire insert has (have) been pushed past the subsequent gates by the molding material which was injected through the first gates.

The present invention provides a process for injection molding plastics in which the material to be injection-molded is controllably introduced into a mold in the absence of any follower, and through various gates or apertures whereby the aforementioned drawbacks are overcome.

The process is quite suitable for manufacturing lengthy articles with relatively thin walls such as plastic bumpers and dashboards for automobiles.

DETAILED DESCRIPTION OF THE INVENTION

According to the present invention an uninterrupted flow front in the mold is obtained. The plastic is initially injected through a first entry gate and then a subsequent gate is utilized to supply injection molding material only after the flow front of the previously supplied material has passed said subsequent gate.

In this fashion a progressive, uninterrupted flow front is obtained. Molten material is continuously supplied through a gate, or gates, behind the flow front. This molten material mixes excellently with the molten material already present in the mold because of its fairly high temperature.

It can also be advantageous to stop injecting material through a given entry gate as soon as the flow front spreading from this gate has passed the immediately following gate(s). For instance, this is a useful procedure to produce articles having both thicker and thinner sections.

After commencing material injection through each gate in turn, the injection may be continued through each such gate until the whole material charge is introduced into the mold. Thus the mold can be rapidly filled.

The thicker section may have a longer cooling time within the total cycle time. After molding the thicker section, the material injection directly to the thicker section is stopped as soon as the desired flow front progression can be maintained by other gates. The cooling time for the thicker section is therefore longer than when hot plastic melt is continuously introduced into the mold through a gate or gates opening into the thicker section.

The time schedule for initiating the plastic melt supply through the individual entry gates for any given article being injection-molded can be easily established by experiment or determined by calculation.

The plastic melt is desireably introduced into the mold through feed lines fitted with valves which are operated and controlled by a process computer.

Other objects, features, and characteristics of the present invention will become more apparent upon consideration of the following description and the appended claims with reference to the accompanying drawing, all of which form a part of this specification.

DETAILED DESCRIPTION OF THE DRAWING

Figure 1:
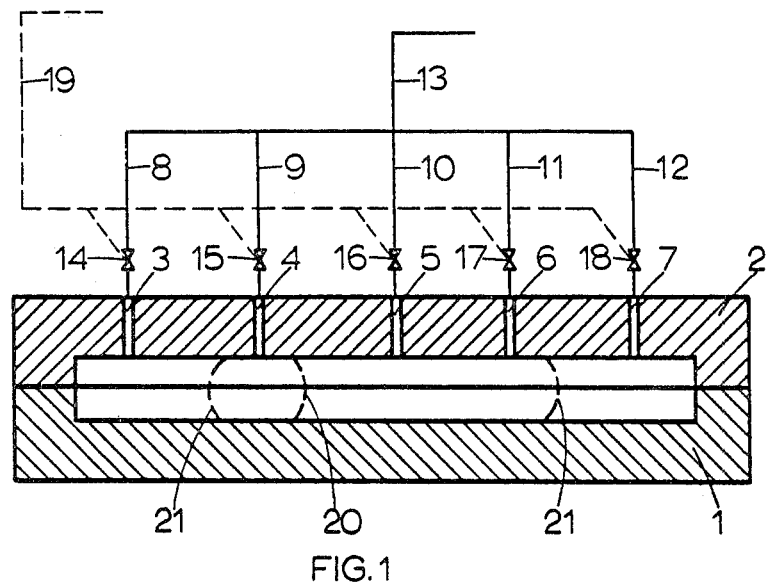
FIG. 1 schematically illustrates the process and device of the present invention for the injection molding of plastic materials.

In FIG. 1, the injection mold A has lower half 1 and upper half 2. Injection mold A has a plurality of gates 3, 4, 5, 6 and 7 with respective feed lines 8, 9, 10, 11 and 12, shown diagrammatically, and which are supplied from a central feed line 13 connected to an injection-molding feed device, not shown. Valves 14, 15, 16, 17 and 18 are located in the respective feed lines. These valves may be pneumatically, hydraulically or electrically opened and closed in any desired sequence, using a process computer (not shown) operating through control line 19. The feed lines are connected to the injection molding equipment with the appropriate gates and control equipment. More or fewer gates and additional feed lines (such as separate lines) may be used with this invention.

If the article being injection-molded has a high length to thickness ratio, it is difficult or impossible to fill the injection mold through only one gate (e.g., gate 5) because the injected material, typically a plastic melt, will already have cooled off or set to a significant extent before its reaches that portion of the mold which is farthest away from such single injecting gate (e.g., gate 5).

In the process according to the present invention, plastic melt can be introduced through a first gate 3 and then controllably introduced through the other gates in appropriate sequence. A flow front then spreads out in all directions from the first gate 3. When the flow front has passed gate 4 and is at the position indicated by a dashed line 20, valve 15 is then opened which allows plastic melt to be introduced into injection mold A through gate 4. The newly introduced hot plastic melt mixes and slightly heats up the melt already present in the mold, while the melt front spreads beyond gate 5. Subsequently valve 16 is then opened and plastic melt is injected into the mold through gate 5. The same procedures apply as the flow front passes gates 6 and 7.

The gates may be closed at varying intervals For instance, valve 14 may be closed as soon as valve 15 is opened, in turn valve 15 can be closed as soon as valve 16 is opened, or valve 15 may be closed only after valve 17 opens, etc. In this fashion, two gates can be made always operative. Additionally, in some cases, each valve can continue to remain open until the scheduled charge of injection material has been completely introduced into the injection mold.

As an alternative method, the melt front may be formed so as to pass gates in more than one direction instead of allowing the flow front to pass consecutively all the gates from left to right starting from aperture or gate 3 as previously described. For instance, gate 5 may be first utilized to inject material into the mold. Then, the moment the closed melt front has reached the position indicated by the dashed lines 21, and has thus passed gates 4 and 6, valves 13 and 17 are opened and, after the flow front has passed gates 3 and 7, valves 14 and 18 are then opened. In this fashion, an injection mold can be filled more rapidly while shortening the injection-mold cycle. This means that while filling the mold, there is only one uninterrupted flow front present in the mold so that no merging of flow fronts occurs. Consequently, weak spots in the finished article are avoided while the appearance of the article is also improved.

The time required for filling the injection mold according to the present invention is usually longer than in a process wherein plastic is supplied simultaneously through all gates. For technical or economic reasons, a compromise must sometimes be made between the disadvantages of this longer filling time and the other advantages of the process according to the present invention. Utilizing two first gates, for example, instead of one first gate is one acceptable compromise. In such a case, there will only be one weld line with its known disadvantages. However, the quality of the article will still be improved since the total number of weld lines is reduced. The present invention is therefore not restricted to utilization of only one first injection gate.

While the invention has been described in connection with what are presently considered to be the most practical and preferred embodiments, it is to be understood that the invention is not to be limited to the disclosed embodiments but on the contrary, is intended to cover various modifications and equivalent processes and devices included within the spirit and scope of the appended claims, which scope is to be accorded the broadest interpretation so as to encompass all such modifications and equivalent devices and processes.

What is claimed is:

1. A process for the injection-molding of plastic material consisting essentially in:
    initially introducing the material charge into a mold having a plurality of entry gates through less than all of said gates, and subsequently introducing the material through at least one additional entry gate only after said flow front has passed said additional gate.

2. Process according to claim 1, wherein said introduction through said first gate is continued until all of said charge is introduced into said mold.

3. Process according to claim 1, wherein said injection through said first gate is stopped after the said flow front has passed at least one subsequent gate.

4. Process according to any of claims 1, 2 or 3, wherein more than one gate is used for said initial introduction.

* * * * *